3,372,191
NITROGENOUS AND FLUORINATED CYCLO-ALKANES AND CYCLOALKENES AND PREPARATION THEREOF

Harry F. Smith, and Joseph A. Castellano, Wayne, N.J., assignors to Thiokol Chemical Corporation, Bristol, Pa., a corporation of Delaware
No Drawing. Filed Sept. 27, 1965, Ser. No. 491,506
20 Claims. (Cl. 260—563)

This invention relates to the preparation of certain nitrogenous and fluorinated products derived from cycloalkadienes.

More particularly, this invention concerns the bis and tetrakis(difluoramino) cycloalkanes and bis and tetrakis (difluoramino) cycloalkenes as well as their alkylated derivatives.

The novel compositions of this invention are valuable as intermediates for the preparation of pesticides, explosives and photochromic agents.

Illustrative products of this invention include among many others are bis(difluoramino)cyclopentenes, the bis-(difluoramino)cyclobutenes, the tetrakis(difluoramino) cyclopentanes, the bis(difluoramino)cyclohexenes, the tetrakis(difluoramino)cyclohexanes, the bis(difluoramino) cycloheptenes, the tetrakis(difluoramino)cycloheptanes, the bis(difluoramino)cyclooctenes, the tetrakis(difluoramino)cyclooctanes, as well as the corresponding bis and tetrakis(difluoramino)cyclononyl and cyclodecyl derivatives. Also included within the scope of this invention are the bis and tetrakis(difluoramino) derivatives of alkylated cycloalkanes and alkylated cycloalkenes, particularly those whose alkyl substituents contain up to 6 carbon atoms.

While all of the compositions of this invention are useful products, as in any large group of products, certain considerations cause certain compositions within the group to be favored over others. In this instance, the considerations are the type of activity desired, ease and cost of preparation, including availability of starting materials and physical and chemical properties such as thermal stability and inertness.

The preferred products of this invention for use as intermediates for photochromic compositions are the bis(difluoramino)cyclohexenes and cyclopentenes. These compositions can easily be prepared from the readily available cyclopentadienes and cyclohexadienes. Further, the yields are good and the addition of tetrafluorohydrazine ($N_2F_4$) can be done either at near atmospheric pressures or superatmospheric pressures.

The next favored group of products of this invention are the tetrakis(difluoramino)cyclohexanes and cyclopentanes. These compounds, while not preferred, are valuable as explosive intermediates and as additives for explosive compositions. Again the same starting materials from which the above products are made are used, but a large excess over the quantities required by stoichiometery is required and the processes preferably run under higher pressurers and for longer times.

The least favored group of products includes the residuum of the disclosed class of products.

It is an object of this invention to prepare a novel class of compositions, the difluoraminated cycloalkenes, those having from 5–10 carbon atoms in the cyclic ring.

A further object of this invention is the preparation of intermediates for preparing photochromic agents.

A related object of this invention is the preparation of intermediates useful in preparing potent explosives.

An additional object of this invention is the development of a method of introducing difluoramino groups into cycloalkene structures.

Additional objects will become apparent to those skilled in the art after a more thorough perusal of this application.

The above objects, among others, are accomplished by the method described more fully below.

In the preferred practice, the difluoramino group ($NF_2$) is introduced into the cycloalkadiene structure by contacting a cycloalkadiene preferably having 5–8 carbon atoms with tetrafluorohydrazine ($N_2F_4$) until the desired number (either 2 or 4) of difluoramino groups have added across the points of unsaturation, the reaction is halted and chilled to condense the product and the noncondensible gases stripped off under vacuum. The products are isolated from the reaction mixture by fractional distillation, preferably under vacuum. Further purification can be effected by the usual methods used to purify amines in synthetic organic chemistry, namely, extraction chromatography, recrystallization and the like.

A second preparative process is to pass an inert gas diluted $N_2F_4$-cycloalkadiene mixture through a coil type of reactor kept at a convenient reaction temperature. The product and by-product gases are condensed in a low temperature trap. After addition is substantially complete, the reaction is halted and the product isolated and purified as before.

In a third method, the addition of $N_2F_4$ to the cycloalkadiene is accomplished using a pressurized reactor such as an autoclave. In this process, the reaction can be conducted in the presence of inert solvent such as the polyhalogenated lower alkanes referred to as the "Freons." Conveniently, the cycloalkene can be dissolved in inert solvent (or the solvent can be dispensed with) and the $N_2F_4$ added to make up the reaction mixture. The reactor is sealed off at the autogenous pressure of the reactants in the sealed reaction vessel and develops the required pressure upon heating the reactor. The pressure can vary widely usually ranging between 150–500 p.s.i.g. The reaction temperature is not critical in this method or in the preceding methods and temperatures of about 15° C. or lower to just below the disassociation point of the starting material can be used. Usually for the pressurized reactions the temperature ranges between about 30° C. to about 80° C. Experience has shown that reaction times vary widely ranging from 30 minutes to 96 hours depending upon the number of difluoramino groups to be added, the reactant, the pressure, the temperature and the like. After the reaction is complete, the reactor is cooled down, the gases vented off and the inert solvent stripped off. The product is purified by vacuum distillation or any other convenient method.

As indicated by the above description, the reaction conditions are not critical to success and numerous modifications and substitutions can be made in the process without adversely affecting results. For example, the following represents the known range of permissible reaction conditions:

The ratio of the two reactants ranges from 1 mole of $N_2F_4$ to 1 mole of cycloalkane up to a large excess of $N_2F_4$ for each mole of cycloalkene used, the main requirement being that sufficient $N_2F_4$ be present to saturate the cycloalkadiene and sufficient pressure and time be allowed where the tetrakis derivative is desired. Smaller quantities of $N_2F_4$ will, of course, produce smaller amounts of product in the form of mixtures that are difficult to resolve. For this reason, a large excess of $N_2F_4$ above that required by stoichiometry is preferred.

The presence of an inert solvent, while not necessary, is a convenience in some of the preparative methods such as the pressurized reactions, but can be dispensed with. The highly halogenated lower alkanes such as carbon tetrachloride, as well as the polyhalogenated 2 and 3 carbon alkanes known as the "Freons" are preferred for this purpose.

As indicated by the described process variations, the pressure utilized can vary from subatmospheric through superatmospheric depending upon the type of process equipment available and the chemist's conveniencee.

Similarly the reaction temperature is a variable dependent upon the reactant used, the pressure employed and the number of difluoramino groups to be added. As is the case in the pressurized reactions the temperature can generally range between somewhat below room temperature and the disassociation temperature of the products. Thus the range can be within 15° C. to 150° C. or higher.

The reaction time is dependent upon a number of experimental variables such as batch size, reaction temperature and pressure, the cycloalkadiene used and the like. Particularly important is whether the bis or tetrakis derivative is to be made. For these reasons, reaction time cannot be stated with precision. However, the extreme range appears to be between 30 minutes to 96 hours for the bis compounds with even longer times being necessary in isolated instances.

To indicate some of the various modifications possible in this invention, the following illustrative embodiments are submitted.

In one embodiment, 1,3-cyclohexadiene (5 parts by weight) is sealed into a nitrogen pressurized autoclave with 10 parts by weight of tetrafluorohydrazine. The initial pressure is 550 p.s.i.g. and the autoclave and its contents are heated to 105° C., for a period of 16 hours. At the end of the reaction time, the heating is halted, the autoclave cooled to room temperature and vented off. The product, a mixture of 1,2- and 1,4-bis(difluoramino) cyclohexenes is purified by fractional distillation under vacuum. Analysis confirms the identity.

In another embodiment, a 10 parts by weight portion of 1,3-cyclopentadiene is dissolved in 60 parts by weight of Freon 113 and tetrafluorohydrazine (50 parts by weight) are sealed into a stainless steel Hoke cylinder and kept for 48 hours at 155° C. under an initial pressure of 500 p.s.i. After cooling the reactor to room temperature, the Freon is distilled off and the product purified by distillation.

A mixture of predominantly 1,2- and 1,4-bis(difluoramino) cyclopentenes with a small amount of 1,2,3,4-tetrakis(difluoramino)cyclopentane is obtained. Both the major product and the by-product consist of cis-trans mixtures of the possible geometric isomers (cis, trans).

In another embodiment of this invention 1,2- and 1,4-bis(difluoramino)cyclopentenes are prepared from commercially obtained cyclopentadiene as follows.

In a suitable reactor equipped with a heating, cooling, stirring means as well as a means of distilling off and condensing products, is added 5 parts by weight of cyclopentadiene dissolved in halogenated solvent such as Freons, or low molecular weight chloroalkanes so as to obtain the moderation of the reaction. The solution is degassed thoroughly by passing through a constant stream of nitrogen. After degassing, the cyclopentadiene is frozen by dropping the temperature down to −100° C. To the frozen cyclopentadiene is added 15 parts by weight of tetrafluorohydrazine ($N_2F_4$). After the two reactants are added, the cooling source is removed and the temperature brought first up to room temperature, then gradually heated to 80° C. The reaction is kept at this temperature for 6 hours and the reaction stopped by removing the heat. The reactor is allowed to come to room temperature and the crude product is purified by distillation under reduced pressure. Chromatographic analysis of the purified reaction product indicates the presence of both cis and trans forms in the final product. No separation is made.

*Preparation of various bis(difluoramino)cyclohexenes*

A 2–1 Pyrex bulb, fitted with a freeze-out tip and a vacuum stopcock terminating in a standard ball joint, is charged with 2.08 g. (0.026 mole) of 1,3-cyclohexadiene in a nitrogen atmosphere. The liquid is frozen at −78° C. and the bulb evacuated. After three additional freeze-thaw cycles with intermittent evacuation, the tip of the flask is cooled to −196° C. and 3.12 g. of tetrafluorohydrazine is condensed into the bulb. The bulb is transferred to a heating jacket and heated at 80–100° C. for 3 hours. The bulb is cooled to room temperature, the contents are condensed in the tip at −78° C. and the volatile components are removed under vacuum. The crude product is distilled under vacuum from the bulb at 30° C. into a trap at −78° C. This synthesis is repeated six times and the combined product distilled to yield 25.60 g. (89% yield) of colorless liquid, B.P. 72–87° C. (24.5 mm.).

*Analysis.*—Calc'd for $C_6H_8N_2F_4$: C, 39.14; H, 4.38; N, 15.21. Found: C, 38.84; H, 4.42; N, 15.26.

The material is subjected to gas-liquid chromatography on a six foot column containing 20% SF–96 silicone oil on 60/80 firebrick at 115° C. and consists of four components. These are dl-trans-1,4-bis(difluoramino)cyclohexene-2, dl-trans-1,2-bis(difluoramino)cyclohexene-3, dl-cis-1,2-bis(difluoramino)cyclohexene-3 and meso-cis-1,4-bis(difluoramino)cyclohexene-2. Ultraviolet catalysed chlorination of the unresolved cis-trans mixture as disclosed in copending S.N. 502,795 filed Sept. 27, 1965, and now abandoned, produces a product which has miticidal activity.

In a further embodiment, a 20 parts by weight portion of 1,3-cycloheptadiene (dihydrotropilidene) is dissolved in 50 parts by weight of Freon 113 and 200 parts by weight of tetrafluorohydrazine is added to the mixture and the reaction mixture is sealed in an autoclave. The autoclave is brought to 90° C. and 450 p.s.i. and the reaction is continued for 32 hours then cooled to room temperature and vented. The solvent is distilled off and the product fractionated under a high vacuum. Three products are isolated, major amounts of the 1,2- and 1,4-bis(difluoramino)cycloheptenes and a minor amount of 1,2,3,4-tetrakis(difluoramino)cycloheptane. The products are separated from each other by fractional distillation under reduced pressure.

In yet another embodiment, 5 parts by weight of 1,3-octadiene is contacted with 40 parts by weight of tetrafluorohydrazine under nitrogen in an autoclave. The autoclave is sealed and heated for 28 hours at 110° C. At the end of this time, the autoclave is cooled down and vented off. The product mixture is separated by chromatography to give the following products: 1,2-bis(difluoramino)cyclooctene, 1,4-bis(difluoramino)cyclooctene, and 1,2,3,4-tetrakis(difluoramino)cyclooctane.

*Preparation of various fluoraminated alkylated cycloalkadienes*

A 5–1 Pyrex bulb, fitted with a freeze-out tip and a vacuum stopcock terminating in a standard ball joint, is charged with 0.1 mole of 5-butylcyclopenta-1,3-diene in a nitrogen atmosphere. The liquid is frozen at −78° C. and the bulb evacuated. After three additional freeze-thaw cycles with intermittent evacuation, the tip of the flask is cooled to −196° C. and 0.25 mole of $N_2F_4$ is condensed into the bulb. The bulb is transferred to a heating jacket and heated at 80–100° C. for 3 hours. The bulb is cooled to room temperature, the contents are condensed in the tip at −78° C. and the volatile components are removed under vacuum. The crude product is distilled under vacuum from the bulb at 30° C. into a trap at −78° C. The expected product 1,4-bis(difluoramino)-5-butylcyclopentene-2- is obtained.

In another embodiment a 5–1 Pyrex bulb, fitted with a freeze-out tip and a vacuum stopcock terminating in a standard ball joint, is charged with 0.02 mole of 2,3-dimethylcyclohexa-1,3-diene a nitrogen atmosphere. The liquid is frozen at −78° C. and the bulb evacuated. After three additional freeze-thaw cycles with intermittent evacuation, the tip of the flask is cooled to −196° C. and 0.03 mole of $N_2F_4$ is condensed into the bulb. The bulb is transferred to a heating jacket and heated at 80–100° C. for 3 hours. The bulb is cooled to room temperature, the contents are condensed in the tip at −78° C. and the volatile components are removed under vacuum. The crude product is distilled under vacuum from the bulb at 30° C. into a trap at −78° C. The expected product 1,4-bis(difluoramino)-2,3-dimethylcyclohexene-2 is obtained.

In related embodiments, 1,4-bis(difluoramino)-2-t amylcyclopentene-2 can be prepared by reacting excess $N_2F_4$ with 1,2-t-amylcyclopenta-1,3, 1,4-bis(difluoramino)-2,5,5-trimethylcyclohexa-2, by the reaction of excess $N_2F_4$ with 2,5,5-trimethylcyclohexa-1,3-diene and 1,4-bis (difluoramino)-5-methylcycloheptene-2 by the reaction of excess $N_2F_4$ with 5-methylcyclohepta-1,3-diene. Chromatographic analysis indicates that both cis and trans forms are present. No separation is made.

As indicated earlier, the halogenated products of this invention are advantageous as pesticidal agents or pesticidal intermediates. When used for this puropse, they can be made up as solid or liquid formulations in the form of their resolved or unresolved cis and trans isomers.

Another advantage of the products of this invention is their comparative ease of preparation, and that they are obtainable in good yield. All of the cycloalkadienes are well known compounds whose preparation and properties are presented, among other places, in "Chemical Abstracts, Chemistry of Petroleum Hydrocarbons," Brooks et al. published by Reinhold.

Tetrafluorohydrazine ($N_2F_4$) is a known reagent having been prepared by Colburn and Kennedy, J.A.C.S., 80, 5004 (1958).

The above discussion and the numerous embodiments disclosed throughout this application are illustrative of the many aspects of this invention and the numerous modifications and variations that can be made without departing from the inventive concept. The metes and bounds of this invention are best shown by the claims which follow.

What is claimed is:

1. Fluoraminated compositions selected from the group consisting of bis(difluoramino)cycloalkenes, bis(difluoramino)alkylated cycloalkenes, tetrakis(difluoramino) cycloalkanes and tetrakis(difluoramino)alkylated cycloalkanes, said cycloalkanes and cycloalkenes having from 5 to 10 carbon atoms in the alicyclic ring.

2. Bis(difluoramino)cycloalkenes having 5 to 10 carbon atoms in the alicyclic ring.

3. Bis(difluoramino)alkylated cycloalkenes having 5 to 10 carbon atoms in the alicyclic ring and up to 6 carbon atoms in the alkyl substituent.

4. Tetrakis(difluoramino)cycloalkanes having 5 to 10 carbon atoms in the alicyclic ring.

5. Tetrakis(difluoramino)alkylated cycloalkanes having 5 to 10 carbon atoms in the alicyclic ring and up to 6 carbon atoms in the alkyl substituent.

6. 1,2-bis(difluoramino)cyclopentene-3.

7. 1,4-bis(difluoramino)cyclopentene-2 .

8. 1,2,3,4-tetrakis(difluoramino)cyclopentane.

9. 1,4-bis-tetrakis(difluoramino)cyclohexene-2.

10. 1,2-bis-tetrakis(difluoramino)cyclohexene-3.

11. 1,2,3,4-tetrakis(difluoramino)cyclohexane.

12. 1,2-bis(difluoramino)cycloheptene-3.

13. 1,4-bis(difluoramino)cycloheptene-2.

14. 1,2,3,4-tetrakis(difluoramino)cycloheptane.

15. 1,2-bis(difluoramino)cyclooctene-3.

16. 1,4-bis(difluoramino)cyclooctene-2.

17. 1,2,3,4-tetrakis(difluoramino)cyclooctane.

18. The method of preparing difluoraminated cyclid products selected from the group consisting of bis(difluoramino)cycloalkenes, bis(difluoramino)alkylated cycloalkenes, tetrakis( difluoramino) cycloalkanes and tetrakis-(difluoramino)alkylated cycloalkanes having from 5–10 carbon atoms in the alicyclic ring, comprising the steps of contacting a reactant selected from the group consisting of conjugated cycloalkadienes and conjugated alkylated cycloalkadienes with tetrafluorohydrazine ($N_2F_4$) until at least two $NF_2$ groups are taken up into said cycloalkadiene and isolating the products contained therein.

19. The method of preparing bis(difluoramino)cyclohexene products comprising the steps of contacting a cyclohexadiene reactant with tetrafluorohydrazine between about 15° C. and below the disassociation temperature of the product until two $NF_2$ groups are taken up into said cyclohexadiene reactant, and isolating the products contained therein.

20. The method of preparing tetrakis(difluoramino) cyclohexene products comprising the steps of contacting a cyclohexadiene reactant with tetrafluorohydrazine between about 15° C. and below the disassociation temperature of the product until four $NF_2$ groups are taken up into said cyclohexadiene reactant, and isolating the products contained therein.

References Cited

Emeleus et al., Advances in Inorganic Chemistry, vol. 3, 1961, pp. 357–359.

CHARLES B. PARKER, *Primary Examiner.*

BENJAMIN R. PADGETT, *Examiner.*

L. A. SEBASTIAN, *Assistant Examiner.*